United States Patent [19]
Suzuki et al.

[11] 3,921,693
[45] Nov. 25, 1975

[54] PNEUMATIC TIRE

[75] Inventors: Yasuo Suzuki, Akigawa; Iwao Arimura, Kodaira; Akira Matsuda, Higashi-Murayama, all of Japan

[73] Assignee: Bridgestone Tire Company Limited, Tokyo, Japan

[22] Filed: Mar. 5, 1974

[21] Appl. No.: 448,437

[30] Foreign Application Priority Data
  Mar. 6, 1973 Japan.................. 48-25720

[52] U.S. Cl................ 152/362 R; 152/354; 152/374
[51] Int. Cl.²..................... B60C 15/06; B60C 9/02
[58] Field of Search........... 152/362 R, 362 CS, 354, 152/355, 357, 358, 374

[56] References Cited
UNITED STATES PATENTS

| | | | |
|---|---|---|---|
| 3,480,065 | 11/1969 | Verdier | 152/354 |
| 3,612,137 | 10/1971 | Guyot | 152/362 R |
| 3,612,138 | 10/1971 | Ravenhall | 152/362 R |
| 3,638,705 | 2/1972 | Devienne et al. | 152/362 R |
| 3,682,223 | 8/1972 | Simpson | 152/362 R |
| 3,722,568 | 3/1973 | Maiocchi | 152/362 CS |

Primary Examiner—Drayton E. Hoffman
Attorney, Agent, or Firm—Sughrue, Rothwell, Mion, Zinn & Macpeak

[57] ABSTRACT

A pneumatic tire having a tread, sidewalls, a pair of beads and a carcass ply, the ends of which are wrapped about the beads, comprising hard rubber layers for protecting the wrapped ends or turnup portions of the carcass ply, at least two ply reinforcement layers fixed to the turnup portions and the hard rubber layers, and rubber stocks having a hardness less than that of said hard rubber layer embracing therebetween the turnup portion of said carcass ply, the hard rubber layer and the ply reinforcement layers, thereby preventing separations at the bead portions to improve the durability of the tire.

15 Claims, 12 Drawing Figures

FIG_1
PRIOR ART

FIG_2

FIG_3

FIG_4

FIG_5

FIG_6

FIG_12

FIG.7

PNEUMATIC TIRE

BACKGROUND OF THE INVENTION

1. Field of the Invention:

This invention relates in general to a pneumatic tire adapted to prevent separations at bead portions to improve the durability of the tire, and particularly to a radial tire whose carcass plies consist of metal cords arranged substantially at right angles to the circumferential direction of the tire.

2. Description of the Prior Art

In conventional radial tires having carcass plies consisting of metal cords, at least one carcass ply, whose cords are arranged at right angles to the circumferential direction of the tire, is wrapped about bead cores to form a wrapped end to turnup portion, and a reinforcement layer (reffered to as a chafer hereinafter) consisting of one or more textile or metal cords is arranged on the inside or outside of the turnup portion. In addition, a large hard rubber stock (referred to as a stiffener hereinafter) is interposed between the carcass ply and its turnup portion, and a rubber chafer of hard rubber is arranged between the chafer and a rim flange for preventing the chafer from shifting from the rim flange.

In the prior art such a hard rubber layer is used in the bead portion for the purpose of strengthening the bead portion because there is a tendency of the bead portion to weaken in comparison with bias tires (which are conventional tires in which a carcass ply consists of alternately laminated cloths rubberized with textile cords).

In the conventional radial tires, furthermore, especially tough breakers are arranged between a tread rubber and the carcass ply radial tires have many superior properties such as wear and puncture resistance. On the other hand, it is impossible to avoid discontinuous rigidity at a junction between the bead portion and a few radial carcass plies consisting of metal cords and flexible side walls consisting of thin side rubbers. As the turnup portions of the carcass plies are usually in the proximity of the discontinuous junctions, failures or separations are apt to occur at the turnup portions when the tire is deformed due to a load.

There have been many attempts to solve this problem, in one of which the turnup portion of the carcass ply extends to the sidewall beyond the proximity of the junction. With this arrangement, however, the end of the turnup portion more greatly deforms when loaded so that the tire is more likely to fail.

On the other hand, it has been suggested to shorten the turnup portion of the carcass ply to limit it in the bead portion which would be hardly deformed. In this arrangement, however, the carcass ply is apt to come off of the bead core resulting in great trouble, because air pressure in tires of this type is 10-20 percent higher than in a bias tire.

In order to avoid failure due to the deformation when loaded resulting from the discontinuity in rigidity over the region from the bead to the sidewall, it has been suggested to strengthen the bead portion by stiffeners and chafers or other reinforcement layers. However, the failure in an early stage resulting from the separation described above cannot be completely eliminated.

SUMMARY OF THE INVENTION

In order to overcome the above disadvantages in prior art tires the pneumatic tire according to this invention has a pair of beads, sidewalls and a carcass ply consisting of at least one rubberized metal cord for reinforcing a tread between said sidewalls. The ends of the carcass ply are radially outwardly wrapped about bead cores to form turnup portions. Hard rubber layers each protect an end of the turnup portion of the carcass ply, and at least two ply reinforcement layers are fixed to the outsides of the turnup portion and the hard rubber layer to form a unitary body. Rubber stocks having a hardness less than that of said hard rubber layer are arranged on the inside and outside of the turnup portion of the carcass ply, the hard rubber layer and the ply reinforcement layers to embrace these layers between said rubber stocks, thereby preventing separations at the bead portions.

The invention resides in the discovery that the separations at wrappped ends or turnup portions of carcass plies are caused not only by strains due to deformations over the region from the bead to the sidewall when loaded, but are also due to strains in the rubber in the proximity of the turnup portion of the carcass ply resulting from the air in the tire.

It is an object of the invention is to provide an improved pneumatic tire having novel bead portions capable of preventing failures or separations between the turnup portion and the rubber layer caused by the discontinuity in rigidity in the proximity of the turnup portion of the carcass ply, which has been an important disadvantage in radial tires having carcass plies of metal cords.

The invention will be more fully understood by referring to the following detailed specification and claims taken in connection with the appended drawings.

BRIEF DESCRIPTION OF THE DRAWINGS

FIG. 1 is a sectional view of a bead portion of a prior art tire;

FIG. 2 is a diagram showing strains in the bead portion varying depending upon rotations of a radial tire;

FIG. 3 is a sectional view of a bead portion of a tire according to the invention;

FIG. 4 is a sectional view of a bead portion of another embodiment of the invention;

FIG. 8 is a sectional view of a test piece for the model test;

FIG. 9 is a sectional view of a modified test piece for the model test;

FIG. 10 is a diagram showing a relationship between the length of hard rubber layer and the life time as a result of the model test;

DESCRIPTION OF THE PREFERRED EMBODIMENTS

Referring now to FIG. 1, there is shown a part of a tire in section, which comprises a sidewall 1, a bead portion 2 and a bead core 3 which includes a carcass ply 4 having metal cords arranged radially (substantially 90° to a circumferential direction of the tire) and having a wrapped end or turnup portion 4', a chafer 5 of metal cord layers, a stiffener 6 and a rubber chafer 7 in contact with a rim 8. In the drawing, stresses are caused by filled compressed air at the end of the carcass ply 4 wrapped about the bead 2.

When the tire is filled with air under pressure, an internal pressure P as shown in arrows causes the bead 2 to be pushed to the rim 8 which in turn causes a reaction force R as shown in arrows so that the bead portion 2 is compressed by the forces P and R thereby causing a flow or strain of the rubber in the stiffener 6 and rubber chafer as shown in arrows S and S'. However hard stiffener and chafer may be, the flow or strain caused by the compression cannot be avoided so long as these materials are rubber.

It has been found in actual measurements that an elongation of the rubber at the end of the turnup portion of the carcass ply may be as much as 30–70 percent at an internal pressure 5–9Kg/cm². The strain caused by filling a tire with air under pressure is referred to as "initial" strain hereinafter.

On the other hand, the ends of the metal cords of ply 4 are exposed at the end of the turnup portion 4' of the carcass ply 4 and do not have any film of brass plating or the like applied to the cords to improve their adhesion to the rubber. Under these circumstances, the large initial strain described above causes a separation between the ends of the cords and the rubber material surrounding them.

The separation will grow progressively larger at the turnup portion 4' due to repeated strains from the internal pressure P and the loads to which the tire is subjected in actual use, so that the durability of the tire is decreased resulting in a short service life In the prior art, the cords of the chafer 5 make an angle with the direction of the flows S and S' to thereby reduce the flows in the stiffener 6 as well as in the rubber chafer 7, but this does not prevent the flows in these parts.

FIG. 2 shows a relationship between rotations of a prior art tire and radial strains in the rubber at the end of the turnup portion of the carcass ply. The tire size is 10.00R20, 14PR with a rim 7.00T as shown in FIG. 1 and it is applied to a vehicle under conditions of 7.0 Kg/cm² internal pressure and 3,6000 Kg load. Starting from a zero strain at no internal pressure, the tire is filled with air under pressure which produces an initial strain $\epsilon$. At a portion immediately below the load the strain is reduced to $\epsilon-\epsilon'$. Accordingly when the tire is subjected to a load, $\epsilon-\epsilon'$ is a value of the flow or strain in the stiffener and rubber chafer at the end of the turnup portion of the carcass ply which tends to separate the cemented rubber from the turnup portion It has been found that in order to prevent a separation at a bead, particularly at the turnup portion of a carcass ply, it is very effective to limit the initial strain as defined above because the initial strain value $\epsilon$ varies within a considerably wide range depending upon the construction of the bead portions, while the strain value $\epsilon'$ caused by a load varies only slightly depending upon the construction.

Consequently, the present invention provides a tire remarkably withstanding separations by stiffening the turnup portion of the carcass ply to prevent an initial stress in the stiffener and rubber chafer due to the inner pressure and its reaction caused by the air filled in the tire.

Referring FIG. 3 showing one embodiment of the invention, an end of a wrapped end or turnup portion 4' of a carcass ply is entirely surrounded by a hard rubber layer $\alpha$ for protection. Adjacent to the outer side of this hard rubber layer is applied two or more rubberized ply reinforcement layers $\beta$ having parallel and intersecting tension resistant elements which consist of metal or organic fiber filaments or cords adjacent to the turnup portion 4' and hard rubber layer $\alpha$, and on both sides of the unitary body of the turnup portion 4', the hard rubber layer $\alpha$, and ply reinforcement layers $\beta$, there is arranged rubber stocks $\gamma$ and $\gamma'$ having a hardness less than that of the hard rubber layer $\alpha$ so that the stocks embrace the unitary body.

With this arrangement the stiffener 6, which is small in size and surrounds the bead core, serves only to protect the bead core. In order to avoid a decrease of rigidity due to the less hard rubber stocks $\gamma$ and $\gamma'$, the inner ends of the ply reinforcement layers $\beta$ extend somewhat longer along the inside of the carcass ply 4. An additional cord reinforcement layer (not shown) may be arranged adjacent to the turnup portion 4' on opposite sides of the ply reinforcement layers $\beta$ unless it adversely affects the purpose described above.

The rubber chafer 7 is arranged within a relatively narrow area adjacent to the rim 8.

With this arrangement the flows S and S' caused by the pressure P and its reaction R resulting from the air filled in the tire are absorbed by the relatively less hard rubber stocks $\gamma$ and $\gamma'$ to prevent the flow in the unitary wrapped end of the carcass ply reinforced by the hard rubber layers. Furthermore, the tire remarkably withstands a bending deformation of the side wall 1 and shearing strains following the thereto between the carcass ply 4 and its wrapped end or turnup portion 4' and between the rim 8 and the turnup portion 4' when traveling and being subjected to a load.

FIG. 4 illustrates another embodiment of the invention. The bead portion is different from that shown in FIG. 3 in that the stiffener 6 and the rubber stock $\gamma$ are arranged between the carcass ply 4 and its turnup portion 4' in the form of wedges oriented in opposite directions, and the reinforcement layer is dispensed with.

Figure 5:
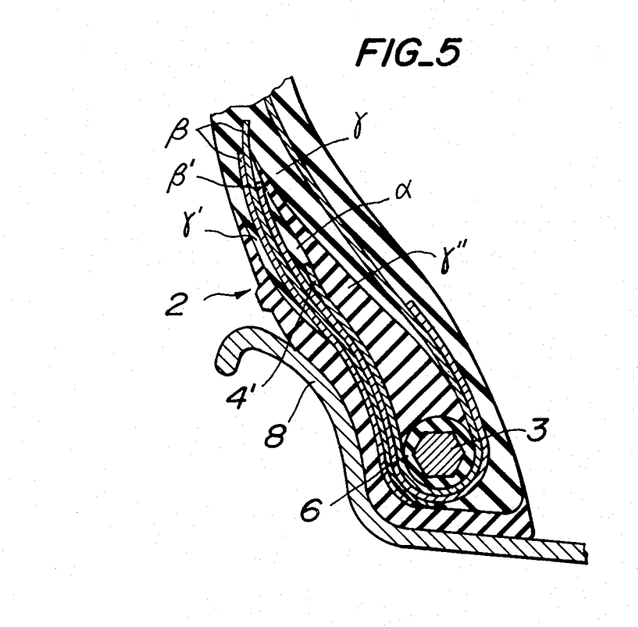
FIG. 5 is a sectional view of a bead portion of further embodiment of the invention.

In FIG. 5 illustrating a further embodiment of the invention, the bead portion is different from those shown in FIGS. 3 and 4 in that a separate ply reinforcement layer $\beta'$ is added to the bead portion and the rubber stock interposed between the carcass ply 4 and its turnup portion 4' is divided into two layers between which is inserted a rubber stock $\gamma''$ of different rubber property.

The reference letter $\beta$ indicates a reinforcement layer of organic fiber cord such as nylon, rayon and polyester, and the letter $\beta'$ indicates a reinforcement layer of metal filament cord such as steel, which layers are wrapped about the bead core 3 from the inside to the outside of the tire.

The rubber stock $\gamma''$ has a hardness between those of the hard rubber layer $\alpha$ and the rubber stock $\gamma$. The stiffener 6 serves only to limit the bead core 3 at the bottom of the bead portion 2.

In this manner according to the invention a hard rubber layer is arranged at the end of the turnup portion of the carcass ply and the ply reinforcement layers having cords at a determined angle to the carcass ply is added to form a unitary body so that the rigidity in this zone is remarkably improved, and relatively softer rubbers are further arranged for embracing the unitary body to minimize the initial strain in the rubber layers, thereby considerably reinforcing the bead portion of the tire.

By employing the following conditions more significant results can be expected:

1. The hard rubber layer $\alpha$ has a Shore hardness of more than 70.

2. The hard rubber layer $\alpha$ has an end extending at least 5 mm in the form of a tongue radially outwardly from the extreme end of the turnup portion of the carcass ply.

3. The difference between Shore hardnesses of the hard rubber layer $\alpha$ and the rubber stocks $\gamma$ and $\gamma'$ is between 10–30.

4. The ply reinforcement layer $\beta$ is rubberized with metal or organic fiber filament or cord having good adherence to rubber.

5. The angle of the tension resistant elements of the ply reinforcement layer $\beta$ is within 20°–45° to the circumferential direction of the tire. When the elements are of two layers, the angles of the elements are arranged in symmetry.

6. The ply reinforcement layer $\beta$ has an outer end extending beyond the outer end of the hard rubber layer and an inner end extending to wrap around the bottom of the bead completely.

7. The ply reinforcement layer $\beta$, the turnup portion 4' of the carcass ply and the hard rubber layer $\alpha$ are in immediate contact with each other.

The developments that led to the invention will now be explained.

Figure 6:
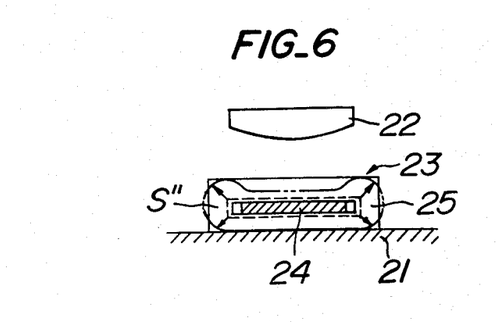
FIG. 6 is a diagrammatic illustration of the model test method using in development of the tire according to the invention.

FIG. 6 shows a tool used for studying the relation between the construction of tire beads and separations. Metal cords for carcass plies were arranged parallel to each other and rubberized to form a metal cord layer 24 which was then embedded in a rubber stock 25. The latter was vulcanized to form a test piece 23 which was set on a base 21. A weight 22 of 60 Kg was dropped from 400 mm above the test piece 23. As a result the piece 23 was instantaneously deformed as shown in dot-and-dash lines to produce flows or strains in the rubber stock at the ends of the metal cord layer 24 as shown by arrows S''. The strain corresponds to the initial strain caused by filling a tire with air. The weight 22 was repeatedly dropped on the piece to produce separations at the ends of the metal cord layer 24. From this experience, we learned when separations in tires occur, how they grow and what their characteristics are.

The metal cord layers 24 used were of a conventional type. The metal cord includes four twisted strands consisting of seven twisted steel wires of 0.18 mm diameter and further steel wires of 0.15 mm diameter spirally coiled thereabout. The metal cords thus made were arranged side by side at a rate of twenty-seven per 50 mm and rubberized to form plates which were severed into square test pieces of 50×50 mm. The rubber stocks 25 were also square plates of 100×100×20 mm. The metal cord layer was embedded in the rubber stock 25.

Figure 7:
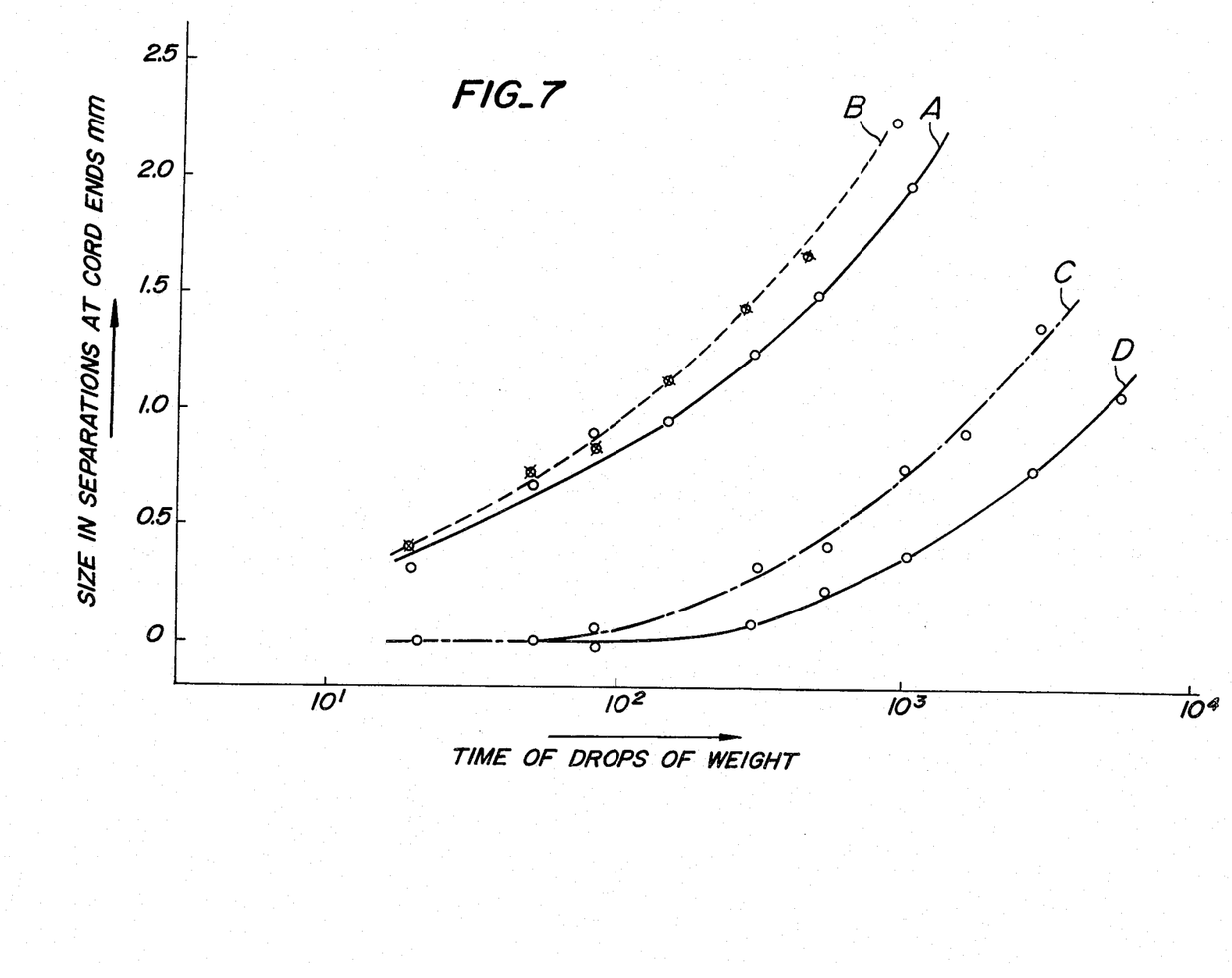
FIG. 7 is a diagram showing results of the model test in FIG. 6.

FIG. 7 shows the results of the tests. The ordinate shows the sizes of separations at the ends of the metal cord layers, and the abscissa illustrates the number of drops of the weight 22 in logarithm. A curve A shows a result of test pieces corresponding to a conventional tire bead construction 1 of which rubber stocks have a Shore hardness of 80. A curve B shows a result with a similar construction with the exception of rubber stocks having a Shore hardness of 60, A curve C shows a result of test pieces 23 shown in FIG. 8 in which is embedded a metal cord layer 24 whose ends are covered by hard rubber layers 26 for protection, of which length $a$ is 10 mm. The hard rubber layer 26 and rubber stock 25 are of Shore hardnesses of 80 and 60, respectively. A curve D shows a result of test pieces shown in FIG. 9 in which a ply reinforcement layer 27 of organic fiber cord is arranged in immediate contact with the lower sides of the metal cord layer 24 and hard rubber layer 26.

The ply reinforcement layer 27 consists of two layers each of which is rubberized with nylon cords of 840 $d/2$ arranged parallel to each other. The nylon cords of two layers are arranged in symmetry and make angles of 30° with a line at a right angle to that of the metal cord layer. The nylon cords are arranged at a density of 38 per 55 mm of length.

It can be seen from the graph shown in FIG. 7 that the number of drops of the weight 22 required for 1 mm growth of separations is 170 in curve A, 100 in B, 1,800 in C and 4,800 in D. This means that for the purpose of preventing separations at metal cord ends due to flows of rubber it is very effective to cover the ends of a metal cord layer with hard rubber layers which are further covered by a soft rubber stock, and the adding of the ply reinforcement layer can remarkably improve the effect of the unitary construction described above.

Moreover, a test piece having a ply reinforcement layer consisting of only one layer and a test piece having a fiber reinforcement layer arranged spaced below 3 mm from the metal cord layer were also used in tests whose results are not shown in the drawing. However, the former did not exhibit any more effect than that of the curve C because there is no pantograph effect resulting from intersecting fiber layers in contact with each other, and the latter only exhibited values between those of the curves C and D.

FIG. 10 shows a result of tests of the pieces shown in FIG. 9, of which the absicissa shows the lengths $a$ of the hard rubber layer and the ordinate shows the number of drops of the weight required for 1 mm growth of separations at the cord ends in logarithm for indicating the life of tires determined by the separations.

It is clearly evident from FIG. 10 that as the length $a$ increases the life span of tires elongates but does not elongate so much after the length $a$ is beyond 10 mm.

Figure 11:
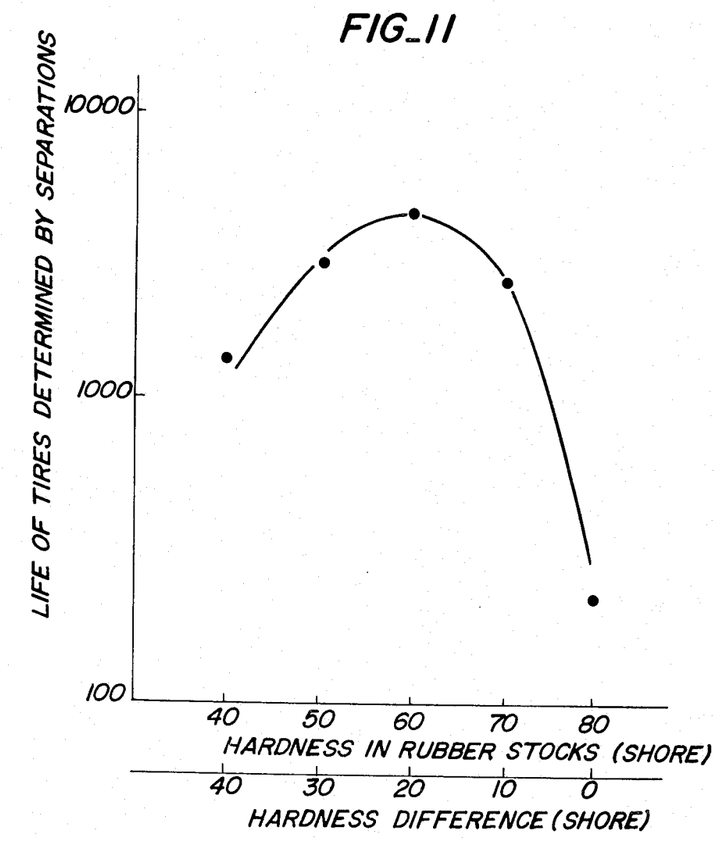
FIG. 11 is a diagram showing a relationship between the hardness in the rubber stocks and the life time as a result of the model test.

FIG. 11 shows in number of drops of the weight required for 1 mm growth of separations at the cord ends depending upon hardnesses of the rubber stocks 25 of the pieces shown in FIG. 9. The ordinate gives the life of tires in logarithm and the abscissa gives Shore hardnesses of the rubber stocks 25 and hardness differences between the rubber stocks 25 and hard rubber layers 26. In this case, the Shore hardness of the hard rubber layers 26 is constant 80 and the length $a$ is constant 10 mm.

According to the illustration of FIG. 11, the life time determined by separations varies in a parabolic curve depending upon the hardness differences which are preferably within a range of 10–30. A hardness difference which is too large is not preferable because of short life span resulting from heating due to strain in the rubber stock.

Figure 12:
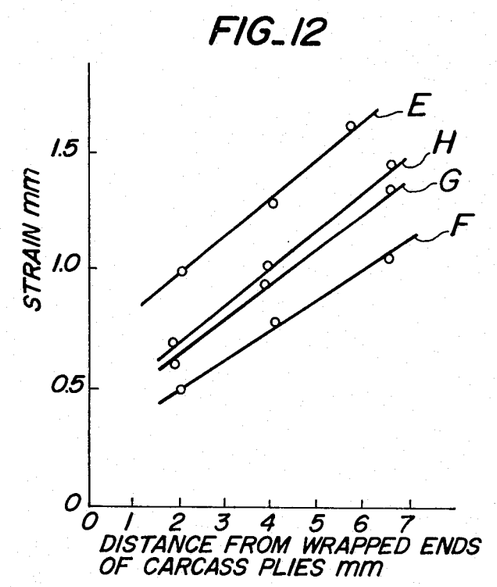
FIG. 12 is a diagram showing a comparison of strains in conventional tires and the tires according to the invention.

FIG. 12 shows results of tests of tires 10,00R20, 14PR based on the above model tests, the strains in bead portions varying depending upon the constructions of the bead portions. The ordinate gives the strains and the abscissa gives the lengths of carcass plies from the ends of their turnup portions or wrapped ends. In this case, the outer rubber layer of the tire bead portion is locally peeled to expose a surface to be measured. The rim used was 7.00T and the air pressure in the tire was 7.0 Kg/cm².

In FIG. 12, a line E shows a result of a conventional tire as shown in FIG. 1 in which a carcass ply 4 has rubberized steel cords at right angles to the circumferential direction of the tire at a density of twenty-seven per 50 mm. The carcass ply is wrapped about a bead core 3 axially outwardly and terminates in the proximity of the end of a rim. The cord of the carcass ply consists of four twisted stands each of which consists of seven twisted steel wires of 0.18 mm diameter and the cord of the carcass ply has a cord of 0.15 mm diameter spirally wrapped thereabout.

In this conventional tire, a chafer 5 consists of two rubberized sheets having steel cords intersecting and in symmetry with each other adjacent axially outwardly to the turnup portion 4' of the carcass ply, one end of which chafer 5 extends 40 mm from the turnup portion 4' and the other end of which wraps about the bead core 3 along the carcass ply 4 and extends radially outwardly to the level of the end of the turnup portion of the carcass ply.

The steel cords are of the same kind of the carcass ply cords and make an angle of 60° with the circumferential direction of the tire. A stiffener having a Shore hardness of 85 between the carcass ply 4 and its turnup portion 4' wraps about the bead core 3 and extends from the bottom of the core 3 along the carcass ply so that the chafer 5 and the turnup portion 4' of the carcass ply are embraced between the stiffener and a rubber chafer having a Shore hardness 85.

In FIG. 12, a line F shows a test result of the tire according to the invention as shown in FIG. 3, wherein a hard rubber layer $\alpha$ having a Shore hardness 80 surrounds in the form of a tongue the end of the turnup portion 4' of the carcass ply for an entire protection of the portion 4', and a fiber reinforcement layer $\beta$ consisting of two layers is arranged axially outwardly adjacent to the hard rubber layer $\alpha$.

The hard rubber layer $\alpha$ extends radially outwardly 25 mm beyond the end of the turnup portion 4' of the carcass ply and one of the ply reinforcement layers $\beta$ extends 10 mm beyond the outer layer $\beta$ and to the position 40 mm from the end of the turnup portion 4. The other ends of the reinforcement layers $\beta$ extend about the bead core 3 along the carcass ply 4 to a location somewhat beyond the level at the radially outward end of the rim 8.

The ply reinforcement layer $\beta$ consists of cloths rubberized with nylon cords of 840 $d/2$ at a density of 38 per 50 mm and arranged in symmetry at an angle of 38° with the circumferential direction of the tire.

A unitary body of the end of the turnup portion 4' of the carcass ply, the hard rubber layer $\alpha$ and the fiber reinforcement layer $\beta$ thus assembled is embraced between the rubber stocks $\gamma$ and $\gamma'$ having a Shore hardness 60. In this case, for the purpose of avoiding a decrease of rigidity due to the less hard rubber stocks $\gamma$ and $\gamma'$, the inner ends of the ply reinforcement layers $\beta$ extend somewhat longer along the inside of the carcass ply 4. In this case, the stiffener 6 having the same property as that of the stiffener in FIG. 3 is arranged only within a small zone about the bead core 3, and the rubber chafer 7 is also arranged only within the engaging part with the rim 8.

A line G in FIG. 12 shows a test result of the tire according to the invention shown in FIG. 4. In this case the rubber stock $\gamma$ is arranged along the hard rubber layer $\alpha$ and the turnup portion or wrapped end 4' of the carcass ply, and the stiffener 6 is arranged along the carcass ply 4 so that the rubber stock $\gamma$ and the stiffener 6 extend in the form of two wedges directed in opposite directions, respectively, and the reinforcement layer 9 in the form of a chafer is dispensed with. The stiffener 6 serves to strengthen the carcass ply 4 over the range from the bead core 3 to the radial outward ends of the fiber reinforcement layers.

A line H in FIG. 12 shows a test result of the tire of the embodiment shown in FIG. 5, which is similar to the tire of line F or G with the exception that the additional ply reinforcement layer $\beta'$ rubberized with parallel steel cords is arranged on the inside of the ply reinforcement layer $\beta$, and a rubber stock $\gamma''$ having a different property is interposed between the rubber stock $\gamma$ and the turnup portion or wrapped end 4' of the carcass ply.

The cords of the ply reinforcement layer $\beta'$ are the same kind of those in the carcass ply. The cords are arranged at a density of twenty-one per 50 mm intersecting the cords of the adjacent fiber reinforcement layer and make an angle 64° with the circumferential direction of the tire, which value is between those of the cords of the carcass ply 4 and the fiber reinforcement layer $\beta$. The cords of the ply reinforcement layer $\beta'$ radially inwardly extend from the level of the proximity of the end of the rim 8 about the bead core 3 along the carcass ply and radially outwardly extend 30 mm beyond the end of the turnup portion 4' of the carcass ply. The reinforcement layer $\beta$ consists of two layers, of which the longer layer extends 40 mm beyond the end of the turnup portion 4' of the carcass ply and the shorter layer extends 5 mm beyond the end of the layer $\beta'$. On the other hand the rubber stock $\gamma''$ having a Shore hardness of 70 is adjacent to the stiffener 6 surrounding the bead core 3 in a small area and extends in the shape of a wedge along the inside of the turnup portion 4' of the carcass ply to enclose the hard rubber layer $\alpha$, these layers being entirely embraced between the rubber stocks $\gamma$ and $\gamma'$ having a Shore hardness 60.

Referring back to FIG. 12, strains (elongations) in the lines E, F, G and H linearly vary depending upon the distances from the ends of the turnup or wrapped ends of the carcass plies. However, it is clearly evident that the strains in the lines F, G and H representative of the tires according to the invention are remarkably less than those in the line E of the conventional tire. For example, ratios of the strains in the lines F, G and H at 4 mm from the ends of the turnup or wrapped ends to the strain in the line E are 0.58, 0.71 and 0.77 which indicate the remarkable reduction of strains due to the initial strain.

The following table illustrates the results of durability test of bead portions observing separations thereat. These tires or four kinds were applied to a drum tester which has a diameter of 2,500 mm and is made of steel having a smooth surface. In the test, the tires were equipped with rims 7.00T and filled with air at 7.25 Kg/cm² and the load applied to the tires was 2,500 Kg.

| Type | E | F | G | H |
|---|---|---|---|---|
| Traveled Distance Km | 4,980 | 7,000 | 7,000 | 7,000 |
| Separation | occurrence | none | just a few | none |

The tire E stopped at the traveled distance when the separations were observed. The other tires also stopped at the respective distances though it was possible to continue the test.

It can be understood that the bead portion of the tire according to the invention is remarkably improved in comparison with those of conventional tires.

It is further understood by those skilled in the art that the foregoing description is a preferred embodiment of the disclosed device and that various changes and modifications may be made in the invention without departing from the spirit and scope thereof.

What we claim is:

1. A pneumatic tire having a pair of bead portions, sidewalls, a tread and a carcass consisting of at least one reinforcing ply of rubberized metal cords, the ends of said carcass ply being radially outwardly wrapped about bead cores disposed within the bead portions to form turn up portions, each bead portion comprising a hard rubber layer having a Shore A hardness of at least 70 to protect the end of said turn up portion of said carcass ply, at least two reinforcement layers fixed outside of said turn up portion and said hard rubber layer to form a unitary body therewith, and rubber stocks having a Shore A hardness of at least 10 less than that of said hard rubber layer and being arranged on the inside and outside of said unitary body so as to embrace the unitary body between said rubber stocks, thereby preventing separations at the bead portions.

2. A pneumatic tire as set forth in claim 1, wherein the difference in the Shore hardness of said hard rubber layer and said rubber stocks is from 10 to 30.

3. A pneumatic tire as set forth in claim 2, wherein at least two cords of said ply reinforcement layers are laminated intersecting with each other.

4. A pneumatic tire as set forth in claim 3, wherein said cords of said ply reinforcement layers make angles of 20°–45° with the circumferential direction of the tire.

5. A pneumatic tire as set forth in claim 3, wherein said ply reinforcement layers are rubberized layers with fiber cords.

6. A pneumatic tire as set forth in claim 3, wherein said ply reinforcement layers are rubberized layers with metal filament cords.

7. A pneumatic tire as set forth in claim 3, wherein said ply reinforcement layers are a combination of rubberized layers with metal filament cords and rubberized layers with fiber cords.

8. A pneumatic tire as set forth in claim 1, wherein a stiffener and one of said rubber stocks are arranged between the carcass and the turn up portion in the form of wedges directed in opposite directions.

9. A pneumatic tire as set forth in claim 1, wherein between said hard rubber layer and said rubber stock is interposed an additional rubber stock which has a hardness lower than that of the hard rubber layer and higher than that of said rubber stock.

10. A pneumatic tire as set forth in claim 1, wherein said hard rubber layers extend at least 5 mm in the form of a tongue radially outwardly from the extreme end of the turnup portion of the carcass ply along the ply reinforcement layers.

11. A pneumatic tire as set forth in claim 1, wherein said ply reinforcement layers extend radially outwardly beyond the outer end of said hard rubber layer and extend inwardly to wrap completely about the bottom of said bead.

12. A pneumatic tire as set forth in claim 1, wherein said ply reinforcement layers are rubberized layers with fiber cords.

13. A pneumatic tire as set forth in claim 1, wherein said ply reinforcement layers are rubberized layers with metal filament cords.

14. A pneumatic tire as set forth in claim 1, wherein said ply reinforcement layers are a rubberized layer with metal filament cords and a rubberized layer with fiber cords.

15. A pneumatic tire as set forth in claim 1, wherein stiffeners are locally limited about said bead cores, hard rubber chafers are substantially limited within contact areas with rims, and rubber stocks are arranged in contact with said chafers radially outwardly along the carcass reinforcement layers.

* * * * *